US011107299B2

(12) United States Patent
Oronte et al.

(10) Patent No.: US 11,107,299 B2
(45) Date of Patent: Aug. 31, 2021

(54) METHOD, APPARATUS, AND SYSTEM FOR PROVIDING MOBILE TRANSPORTATION PLATFORM DATA CAPTURE FOR DATA ANALYTICS

(71) Applicant: Microsystems Automation Group, Falls Church, VA (US)

(72) Inventors: Stephen M. Oronte, Marshfield, MA (US); Lee Hall, San Tan Valley, AZ (US); Eric Jacobs, Great Falls, VA (US)

(73) Assignee: Microsystems Automation Group, Falls Church, VA (US)

( * ) Notice: Subject to any disclaimer, the term of this patent is extended or adjusted under 35 U.S.C. 154(b) by 22 days.

(21) Appl. No.: 15/958,841

(22) Filed: Apr. 20, 2018

(65) Prior Publication Data
US 2019/0325664 A1    Oct. 24, 2019

(51) Int. Cl.
| | |
|---|---|
| *G07C 5/00* | (2006.01) |
| *G07C 5/08* | (2006.01) |
| *H04W 8/20* | (2009.01) |
| *H04W 8/00* | (2009.01) |
| *H04W 4/02* | (2018.01) |
| *H04W 4/40* | (2018.01) |
| *H04W 48/08* | (2009.01) |
| *H04W 8/24* | (2009.01) |

(52) U.S. Cl.
CPC .......... *G07C 5/008* (2013.01); *G07C 5/0808* (2013.01); *H04W 4/02* (2013.01); *H04W 4/40* (2018.02); *H04W 8/005* (2013.01); *H04W 8/205* (2013.01); *H04W 8/24* (2013.01); *H04W 48/08* (2013.01)

(58) Field of Classification Search
None
See application file for complete search history.

(56) References Cited

U.S. PATENT DOCUMENTS

| | | | | |
|---|---|---|---|---|
| 2004/0054550 | A1* | 3/2004 | Cole | G06Q 10/10 705/7.38 |
| 2014/0143839 | A1* | 5/2014 | Ricci | H04W 12/06 726/4 |
| 2014/0358394 | A1* | 12/2014 | Picciotti | G06F 21/6218 701/70 |
| 2016/0165460 | A1* | 6/2016 | Mikkelsen | H04M 1/72519 455/423 |
| 2017/0079079 | A1* | 3/2017 | Pathuri | H04W 76/11 |
| 2018/0077472 | A1* | 3/2018 | Raza | H04Q 1/148 |
| 2018/0130270 | A1* | 5/2018 | Scheid | G07C 5/008 |
| 2018/0270608 | A1* | 9/2018 | Thoresen | G01S 5/14 |
| 2018/0316699 | A1* | 11/2018 | David | G06F 21/566 |

(Continued)

*Primary Examiner* — Noel R Beharry
*Assistant Examiner* — Rodrick Mak
(74) *Attorney, Agent, or Firm* — Ditthavong, Steiner & Mlotkowski

(57) ABSTRACT

An approach is provided for mobile transportation platform data capture. The approach, for instance, involves collecting through electronic means, a comprehensive aggregation of technical computing data, communications data, control systems data, systems configuration data, and network data on mobile transportation platforms (e.g., aircraft, automobiles, trains, ships, etc.) and the ecosystems they operate in. This would create a single comprehensive, searchable, repository of technical data for a specific, mobile platform event stamped for time and/or location.

24 Claims, 7 Drawing Sheets

(56) References Cited

U.S. PATENT DOCUMENTS

| | | | |
|---|---|---|---|
| 2019/0089748 A1* | 3/2019 | Manor | H04L 63/205 |
| 2019/0176862 A1* | 6/2019 | Kumar | G06K 9/00651 |
| 2019/0222485 A1* | 7/2019 | Sethi | H04W 24/06 |
| 2019/0246240 A1* | 8/2019 | Koohmarey | H04W 8/005 |

* cited by examiner

METHOD, APPARATUS, AND SYSTEM FOR PROVIDING MOBILE TRANSPORTATION PLATFORM DATA CAPTURE FOR DATA ANALYTICS

BACKGROUND

Mobile transportation platforms (e.g., aircraft, automobiles, ships, trains, etc.) generally are comprised of a complex integration of various computer systems, devices, controllers, networks, etc. Having the capability to monitor, diagnose, and document the combination of these systems, devices, networks, radio signals, etc. of these mobile transportation platforms and the technical ecosystems where they operate can be an important part of understanding and potentially protecting them from a variety of potentially malicious threats and improve the "quality" of planned changes. Because of the mobility and complexity of the platforms, these platforms change on a regular and/or irregular basis, thereby making the monitoring of the exact technical status of mobile transportation platforms a significant technical challenge. Further, it can be valuable to understand the configuration of the ecosystem in which a mobile platform is operating to assist in indentifying in where and where authorized and potentially authorized changes occur to the mobile platform digital configuration.

SOME EXAMPLE EMBODIMENTS

Therefore, there is a need for an approach for providing mobile transportation platform data capture for data analytics, audits, and other purposes.

According to one embodiment, a computer-implemented method comprises designating, by a processor, an ecosystem including a mobile transportation platform. The ecosystem, for instance, is an environment delineated by a perimeter surrounding the mobile transportation platform. The method also comprises collecting data characterizing one or more systems, one or more devices, one or more networks, one or more signals, or a combination thereof located in the ecosystem and/or the including the mobile transportation platform. The method further comprises storing the data as a technical fingerprint data record for the ecosystem. The method further comprises tagging the technical fingerprint data record with a timestamp indicating a time the data was collected, with a geolocation associated with the ecosystem when the data was collected, or a combination thereof. In one embodiment, the tagged and stored technical fingerprint data record is then made available for audits, post-collection analytics, real-time data analytics, and/or other uses.

According to another embodiment, an apparatus comprises at least one processor, and at least one memory including computer program code for one or more computer programs, the at least one memory and the computer program code configured to, with the at least one processor, cause, at least in part, the apparatus to designate an ecosystem including a mobile transportation platform. The ecosystem, for instance, is an environment delineated by a perimeter surrounding the mobile transportation platform. The apparatus is also caused to collect data characterizing one or more systems, one or more devices, one or more networks, one or more signals, or a combination thereof located in the ecosystem. The apparatus is further caused to store the data as a technical fingerprint data record for the ecosystem. The apparatus is further caused to tag the technical fingerprint data record with a timestamp indicating a time the data was collected, with a geolocation associated with the ecosystem when the data was collected, or a combination thereof. In one embodiment, the tagged and stored technical fingerprint data record is then made available for audits, post-collection analytics, real-time data analytics, and/or other uses.

According to another embodiment, a non-transitory computer-readable storage medium carries one or more sequences of one or more instructions which, when executed by one or more processors, cause, at least in part, an apparatus to designate an ecosystem including a mobile transportation platform. The ecosystem, for instance, is an environment delineated by a perimeter surrounding the mobile transportation platform. The apparatus is also caused to collect data characterizing one or more systems, one or more devices, one or more networks, one or more signals, or a combination thereof located in the ecosystem. The apparatus is further caused to store the data as a technical fingerprint data record for the ecosystem. The apparatus is further caused to tag the technical fingerprint data record with a timestamp indicating a time the data was collected, with a geolocation associated with each system, device, network, or radio signal in the the ecosystem when the data was collected, or a combination thereof. In one embodiment, the tagged and stored technical fingerprint data record is then made available for audits, post-collection analytics, real-time data analytics, and/or other uses.

According to another embodiment, an apparatus comprises means for designating an ecosystem including a mobile transportation platform. The ecosystem, for instance, is a physical environment delineated by a perimeter surrounding the mobile transportation platform. The method also comprises collecting data characterizing one or more systems, one or more devices, one or more networks, one or more signals, or a combination thereof located in the ecosystem. The method further comprises storing the data as a technical fingerprint data record for the ecosystem. The method further comprises tagging the technical fingerprint data record with a timestamp indicating a time the data was collected, with a geolocation associated with the ecosystem, or a combination thereof. In one embodiment, the tagged and stored technical fingerprint data record is then made available for audits, post-collection, real-time data analytics, and/or other uses.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the client device side or in any shared way between service provider and client device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing mobile transportation platform data capture for data analytics are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
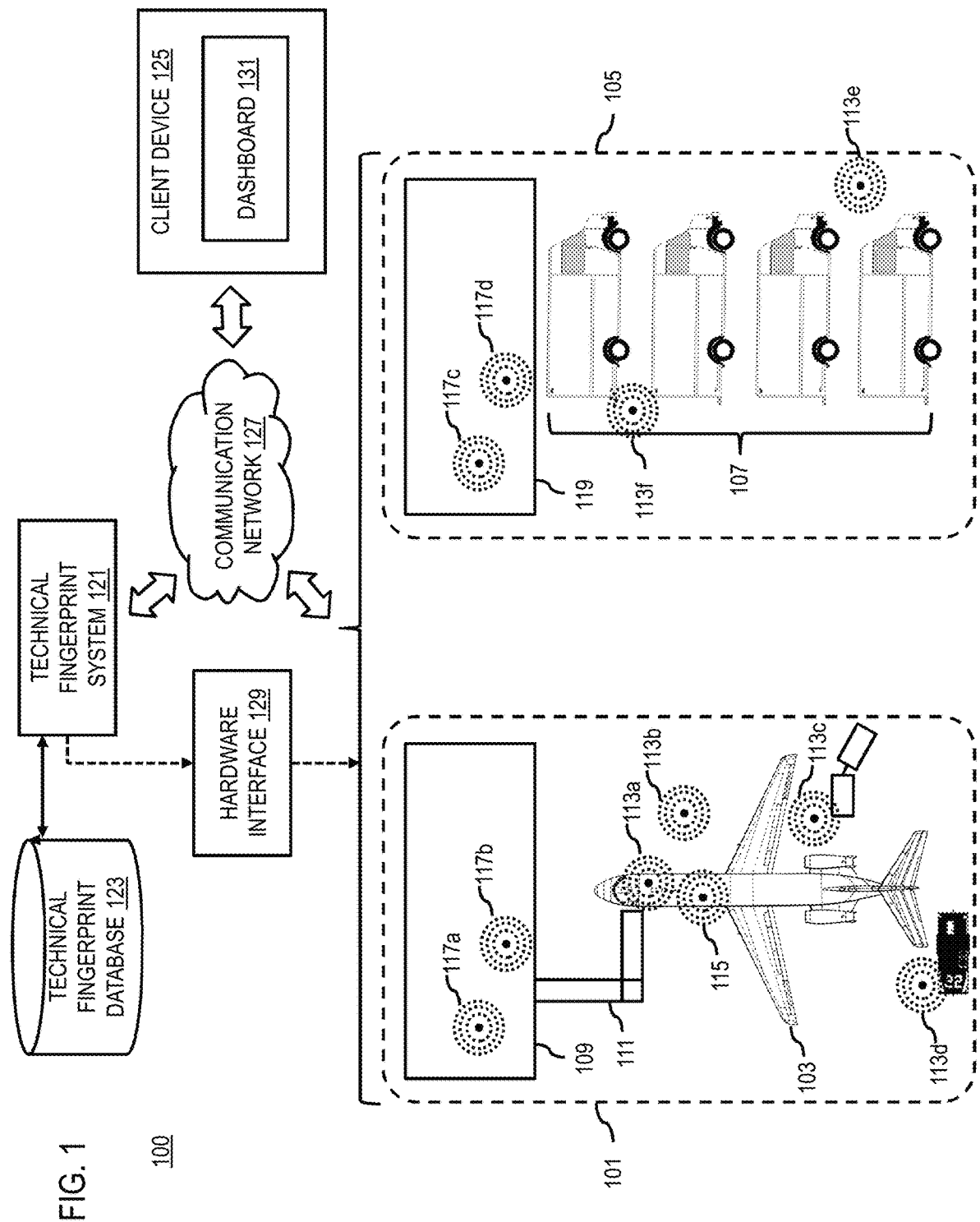
FIG. 1 is a diagram of a system capable of providing mobile transportation platform data capture for data analytics, according to one embodiment.

FIG. 1 is a diagram of a system capable of providing mobile transportation platform data capture for data analytics, according to one embodiment. As used herein, a "mobile transportation platform" refers to vehicles that utilize electronic systems, computing, communications, radios, networks, and related operating data and devices to operate or control their mechanical and electronic systems. For example, mobile transportation platforms can include, but are not limited to: aircraft (e.g., including unmanned aerial systems (UAS)), automobiles (e.g., including autonomous cars, trucks, etc.), trains, ships, and/or any other transportation platform include electronic/computing systems, devices, and/or networks. In the description below, "mobile transportation platform" is used interchangeably with "mobile platform."

Virtually all mobile transportation platforms use a complex set of interconnected computing devices and software to operate various internal and external communications systems, actuate a variety of programmable logic controllers, enable and enhance navigation, provide occupant services, record trip data, surveillance, situational awareness data, and an ever-growing set of other operational services. Some of the information on the platform is also used for third party systems, that manage, use and display critical trip data for these systems and other human usage. Additional development is also occurring to utilize these systems, devices, and networks to provide autonomous operation of mobile transportation platforms.

These mobile platforms can be very different in form, however they all have similar characteristics and share commonalities in that they are comprised of electronic computers, sensors, industrial controls, wired and wireless communications, navigation, and a corresponding set of cyber security issues. Each mobile platform in each transportation mode has unique technical characteristics and subsequently unique technical differences. Additionally, mobile platforms that are otherwise identical by transportation mode, model, manufacturer, and operator are often very different when evaluated by their detailed technical configurations. There can be wide variability at the low level technical component parts such as processors, operating systems, software version, patch status, radios, or other components and systems on the platform. In some embodiments, many of these platforms and their supporting systems and networks can be modified in the field v (e.g., onsite via physical/wired connectivity or remotely via radio frequency (RF)/wireless connectivity) to add further complexity.

The mobile platforms addressed by this disclosure are increasingly comprised of computerized components that create "systems of systems" that run over "networks of networks". These platforms are subject to configuration and technology update and change over time. Generally, these individual changes are well controlled and documented, however the variability of the platforms makes it challenging to know the exact technical fingerprint of the platform and impairs the ability to understand the impact of some changes to each platform.

Some of these platforms have a significant life span of 5 to more than 30 years, preceding current system and network technologies. In other words, mobile platforms that have been in the field for a long period of time may predate advances in computing and communication systems used in later models that provide additional defenses against potential security threats. This creates a situation where earlier computing and communications systems can differ significantly from systems used for later platforms, contributing to the variability of the technical fingerprints across platforms. In some cases, these advances may take many years to "ripple" through a particular model of mobile platform.

The mobile platforms addressed by this disclosure are increasingly deploying commercial-off-the-shelf (COTS) components and are using global open standards (GOS) for operating systems, devices, networking and communications. This trend allows these platforms to leverage a broad community for support and development but also exposes the platform to a community with the ability to identify or acquire awareness of security flaws. The use of COTS and GOS hardware and software is an unstoppable trend in all of information technology that will continue, including the mobile platform space.

Mobile Platforms are complex, diverse, and regularly subject to change through various methods including physical media and wireless access. Each transportation mode, mobile platform, manufacturer, model, etc. may have unique processes for manufacturing, operating, maintaining and updating the platforms that can vary by any number of criteria. This reality further exacerbates the "as-is" knowledge or current configuration of any specific mobile platform at any specific time and/or location.

Historically, the variabilities of the technical configuration of mobile platforms as described above are not sufficiently documented or quantified, are often poorly understood, and the data defining both the similarities and their differences does not currently exist.

For example, in the aviation space, the mobile platforms (e.g., aircraft) have a combination of avionics systems, ground support systems, human interface systems, aircraft control systems similar to industrial control systems, and various other systems. Many of these systems interact with the operational environment that includes the National Air Space (NAS), aircraft operators, maintenance services, and airport support systems such as fuel services, food services, freight, and baggage services to execute their operations. Each of these interactions frequently include computer operations, radio communications, and human interface.

Because of the nature of mobile transportation platforms, the operating locations of the platforms can also introduce variability. For example, part of the ecosystem where mobile platforms operate can include terminals, stations, or other combined public-private environments. In these environments, there are many other systems, devices, networks, people, etc. that can potentially affect the technical fingerprint of the platform. Some of these systems, device, networks etc. are in proximity for known and unknown reasons.

Two examples of such ecosystems are shown in FIG. 1 (e.g., an ecosystem 101 including an aircraft 103, and an ecosystem 105 comprising a fleet of trucks 105) in a operating facility. In one embodiment, an ecosystem refers to an environment that includes a mobile platform (e.g., typically encompassing a volume of space around the mobile platform). Everything in the environment, including the mobile platform itself, would be part of the ecosystem. In the examples of FIG. 1, the aircraft-based ecosystem 101 includes a mobile transportation platform (e.g., the aircraft 103) that has recently landed at an airport and is connected to a terminal gate 109 via a jetway 111. In the ecosystem 101, various support systems, devices, and personnel are located near the aircraft mobile transportation platform 103 (e.g., support entities 113a-113d, also collectively referred to as support entities 113). These support entities 113 can perform various aircraft support functions including, but not limited to: platform maintenance and fueling operations (e.g., aircraft maintenance by support entity 113b), luggage handling (e.g., performed by support entity 113c), cleaning/catering support tasks (e.g., performed by support entity 113a), safety functions such as de-icing (e.g., performed by support entity 113d), and/or other necessary operational functions. Generally, all support entities 113 involved in these activities and/or the physical implements they use to carry out their jobs can use computing devices with communications capabilities. These computing devices can pose potential cyber threats to the aircraft mobile transportation platform 103, the ecosystem 101, and/or any other components of the ecosystem.

In addition, other random entities (e.g., a passenger 115) and/or other nearby people (e.g., persons 117a and 117b waiting at the terminal gate 109, also collectively referred to as persons 117) may also be in proximity to the mobile transportation platform 103 and operate their own computing devices (e.g., personal cellphones, computers, tablets, etc.). Like the support entities 113, these persons 117 and their devices can also be significant as possible origins of malicious activities.

In one embodiment, it is contemplated that an ecosystem can include any type of mode of transportation. The ecosystem 105 illustrates an example in which trucks 107 are the mobile transportation platforms of interest (e.g., versus the aircraft 103 of the ecosystem 101). However, the ecosystem 105 share similar components and characteristics. For example, the ecosystem 105 can include a warehouse 119 with loading docks from the trucks 107. The ecosystem 105 can also include support entities 113e and 113f (e.g., mechanics, drivers, loaders, etc.) as well as random persons 117c and 117d (e.g., staff, customers, etc.) in the warehouse 119. As in the example of the ecosystem 101, each of the support entities 113 and persons 117 can use computing devices that can pose potential threats.

It is noted that the ecosystems based on aircraft 103 and trucks 107 as mobile transportation platforms are provided by way of illustration and not as limitations. It is contemplated that the ecosystems include any other type or combination of types of modes of transportation.

In summary, mobile platforms (e.g., aviation, rail, automobile platforms, etc.) can include a complex collection of computer systems, networks, communications systems, and other electronic components, which are subject to configuration and technology updates and changes over time. These updates and changes can occur across the entire operational model of a mobile platform, e.g., with respect to airliners, from operator updates, upgrades, maintenance, to support operations (e.g., baggage operations, cleaning, food services, etc.) Additionally, many of these operations are performed by third parties. The changes that the platforms undergo change the technical fingerprint of the platform. Most individual changes are well controlled and documented, however the variability of the platforms as well as the ecosystem system in which the platform is located impairs the ability to always understand the impact of some changes to each platform. This impairment presents a significant technical challenge to service providers and other users who want to comprehensively monitor the technical configuration of mobile platforms and their ecosystems.

To address these technical challenges, in one embodiment, a system 100 of FIG. 1 introduces a capability to collect and store data (e.g., command, communications, and configuration data of electronic systems, devices, networks, etc.) from ecosystems that include mobile transportation platforms and any other devices, systems, networks, signals, etc. discovered in the ecosystem. In other words, the system 100 creates a technical fingerprint that represent the configuration data for systems, devices, networks, signals, etc. that are equipped on a mobile platform as well as the ecosystem in which the mobile platform resides. In this way, the resulting technical fingerprint is a representation of both the overall technical fingerprint of the ecosystem based on the technical configurations of the mobile transportation platform as well as any other component in the ecosystem.

In one embodiment, the ecosystem is a defined environment in which the mobile platform is residing. The environment can be delineated by a perimeter that surrounds a mobile platform of interest. As discussed above with respect to the examples of FIG. 1, the ecosystem 101 is delineated by on a perimeter that encompasses an environment including the mobile platform 103 (e.g., an aircraft) as well as the terminal gate 109, persons 117 at the terminal gate 109, jetway 111, support entities 113, passenger 115, and any other systems, devices, networks, signals, persons, etc. located in the ecosystem 101. The system 100 then collects data characterizing the mobile platform 103, systems, devices, networks, persons, signals, etc. located in the ecosystem 101 to generate a technical fingerprint representing the entire ecosystem 101. In other words, in one embodiment, the data collected and stored can also include related, proximity based, human information and the technical components used in this ecosystem 101. This ecosystem-wide technical fingerprint can enable a range of operational analyses in near real time as well as enable legitimate computer forensics, operational monitoring, safety and security assessments, and/or other similar uses. For example, the technical fingerprint data can be evaluated in near real time for cyber security threats or any number of data analysis needs.

In one embodiment, the system 100 includes a technical fingerprint system 121 that can collect technical fingerprint data to represent, e.g., the determined technical configuration of the systems, devices, networks, radio signals, usage data, etc. discovered in an ecosystem (e.g., ecosystem 101 and 105) at a given location and/or time. The technical fingerprint data can be stored in a purpose designed database (e.g., a technical fingerprint database 123 or equivalent). The stored technical fingerprint data can then facilitate near real-time or post-event analytics at any time. For example, a client device 125 can access the functions of the technical fingerprint system 121 and/or the data of the technical fingerprint database 123 over a communication network 127. In one embodiment, the technical fingerprint system 121 can interrogate or access the assets/components of the mobile platform 103 and its ecosystem 101 over the communication network 127 (e.g., wireless interrogation), or using a wired connection through a hardware interface 129. For example, the hardware interface 129 can be a port (e.g., a network jack), interface, bus, etc. on one or more assets of the mobile platform 103 or other devices, systems, etc. in the ecosystem 101. The type of interrogation (e.g., wireless or wired) can depend on security policies, device capabilities, etc.

In one embodiment, access to the technical fingerprint system 121 and/or the technical fingerprint database 123 can be on a restricted-access basis where, for instance, security credentials are needed for access, a fee or subscription is needed for access, etc. The client device 125 can then use the accessed technical fingerprint data for data analytics including, for instance, generating a dashboard 131 or other equivalent user interface to monitor, diagnose, document, etc. the ecosystem 101 of a mobile platform 103 of interest.

Having the capability to monitor, diagnose, and document a mobile platform 103 and the technical ecosystem 101 where and when it operates can be an important part of understanding and potentially protecting the mobile platform 103 and ecosystem 101 from a variety of potentially malicious threats. This technical footprint is an important first step for aggregating critical but currently not well understood data. In one embodiment, the aggregated data of the technical footprint database 123 can be mined for knowledge extraction that could help identify currently unknown combinations of possible threats, threat sources, or threat vectors and assist in understanding optimal cyber security mitigation strategies. Moreover, the technical footprint data will be a useful repository for information that may be used for post event analysis, cyber forensics, or ongoing operational process improvements. As well as any number of other data analysis functions.

Re-creating the exact technical status of a mobile platform 103 and its ecosystem 101 at different points in time according to the various embodiments described herein would be difficult or impossible using traditional techniques. As a result, routine, "across the entire platform" collection and monitoring and diagnostics of mobile platforms 103 and their ecosystems 101 for safety and cyber security risks, or for any other reason, has historically been virtually non-existent. This is true in part, because the data is dynamic and subject to many operational variables. platform-by-platform baseline data has generally existed however, no process for the collection of widespread technical fingerprint data has historically been undertaken.

Further, it would be difficult to undertake a cyber forensic analysis without actual technical data of the mobile platform 103 and its ecosystem 101 including an understanding of what the configuration of the platform 103/ecosystem 101 was at various times and/or locations, and when and how the configuration of the platform changed over its operational life. To address this additional technical challenge, in one embodiment, the system 100 (e.g., via the technical fingerprint system 121) tags the collected technical fingerprint data with a data collection time and/or geolocation of the mobile platform 103 and/or any other component (e.g., system, network, device, signal, etc.) in the ecosystem 101. This tagging enables the system 100 to advantageously log and evaluate the changes to the technical fingerprint (and, therefore, changes to the mobile platform 103 and ecosystem 101) over time and/or location. To facilitate this tracking, in one embodiment, the system 100 can collect and record the technical fingerprint data for a given mobile platform 103 and its ecosystem 101 periodically, in near real-time, on demand, according to a schedule, etc. to generate a time or location sequence of technical fingerprint data records.

For example, in one post-event cyber forensic use case, a specific event such as a security breach, accident, etc. can be examined for a mobile platform 103 or ecosystem 101. An investigator or other user can then use the client device 125 to query for technical fingerprint data records for the mobile platform 103 and its ecosystem 101. In one embodiment, the technical fingerprint data consists of data including, but not limited to, all accessible computers by type and operating system, network devices and their configurations, patch versions, programmable logic controllers and the system controls, sensors, operating systems, software, log files, all connected devices, surrounding networks in radio range, users of those networks and the devices they carry, other communicating platforms, detected signals (e.g., RF signals), and/or other data in proximity to the mobile platform 103 or located within the ecosystem 101 of the mobile platform 103.

It is noted that the examples of the types of data that can be collected to characterize the mobile platform 103 and its ecosystem 101 described herein are provide by way of illustration and not as limitations. Accordingly, it is contemplated that any data and/or data collection/asset discovery method known in the art can be used to collect data for inclusion in the technical fingerprint data of the mobile platform 103 and its ecosystem 101. For example, the system 100 can additionally collect detailed information on devices in radio range, networking and computing information related to them, radio frequency (RF) signals (e.g., from transmitting or receiving devices in the ecosystem 101 or signals traversing through the ecosystem 101 from devices outside the ecosystem 101), etc. The system 100 can also collect similar information for network connected things capable of communicating and processing, including capable of forming ad-hoc networks that might accept node connections, content share, or provide routing. The system 100 can then store, and time stamp this data with details of the mobile platform 103/ecosystem 101, location, and/or other identifying data as part of the operating environment.

Based on the technical fingerprint data that is collected and stored according to the various embodiments described herein, the investigator or user would have access to a central repository of data to support a detailed analysis of the environment or ecosystem 101 of the mobile platform 103 for the specific event of interest. In this way, the investigator or user can perform cyber forensics or other data analytics of the technical fingerprint of the ecosystem 101 over time to examine the specific event of interest or other operational events related to a specific event of interest using the detailed data of the technical fingerprint database 123.

In other words, the technical fingerprint data provides a reliable set of data that can be used to understand what event may have happened, how it may have occurred, and/or other forensic information. More specifically, collecting and preserving this data set would enable experts to forensically analyze and reconstruct events that may have taken place. This data repository would enable reconstruction of a specific series of events and could facilitate post event analysis. In one embodiment, the technical fingerprint data can also be used for near real-time monitoring for safety and security across the entire mobile platform's ecosystem. Specifically, it would have high value for cyber security analytics.

It is noted that there are a wide range of analyses that could be performed when the system 100 electronically scans, interrogates, and inspects, the ecosystem 101 of mobile platforms 103, devices and other communicating implements in the ecosystems 101 where these mobile platforms 103 operate. Therefore, the example forensics and data analytics use cases described herein are provided as illustrations and not as limitations. For example, beyond facilitating the defense-in-depth approach to networks, systems, devices, etc., the value of having a digital forensic data source (e.g., the technical fingerprint database 123) and capability is high for audits, internal investigations, and also for intelligence gathering for law enforcement and as a counter-measure to detect and stop systems based crimes, attacks, and security breaches.

Figure 2:
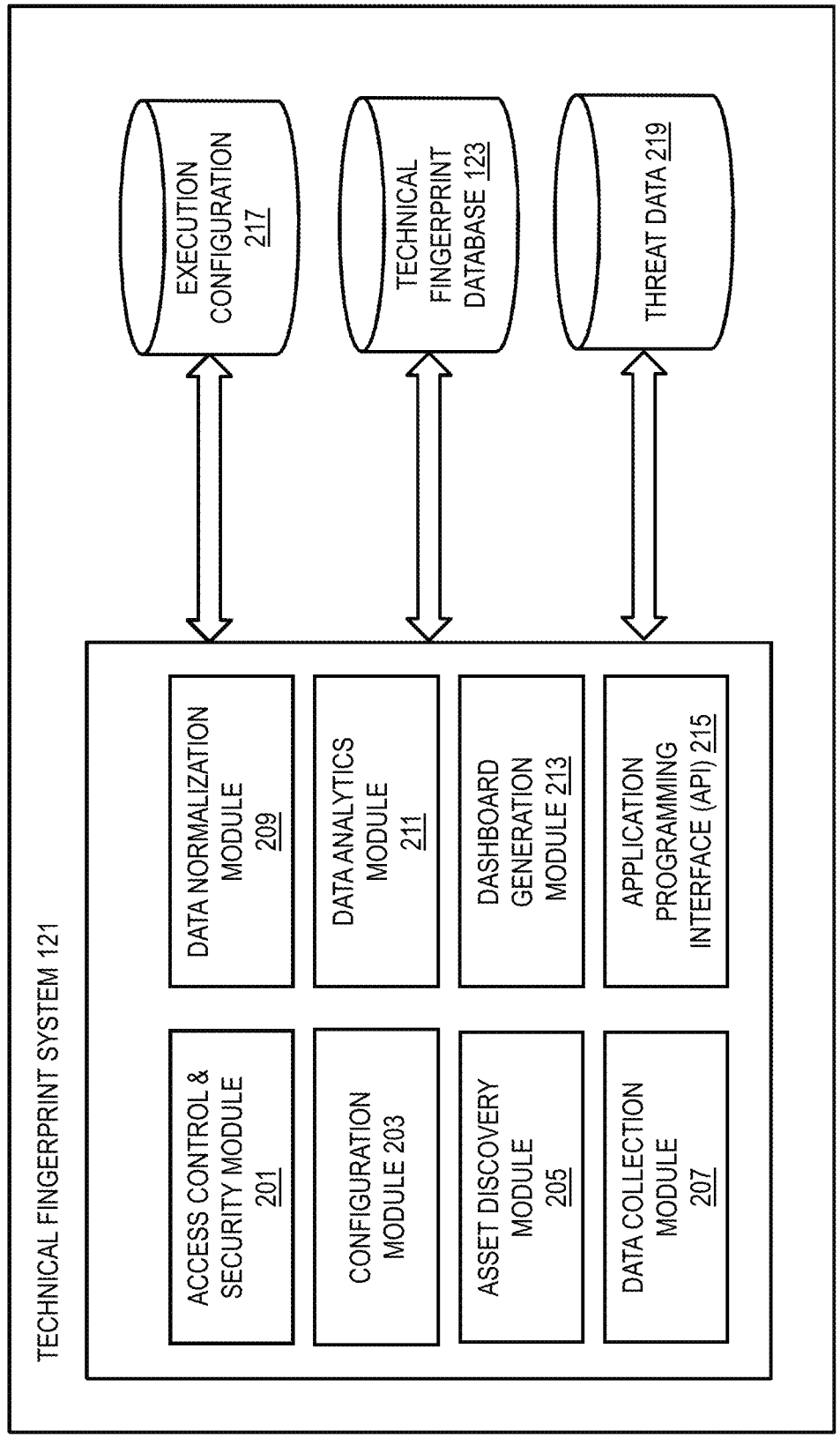
FIG. 2 is a diagram of the components of a technical fingerprint platform for mobile transportation platform data capture, according to one embodiment.

FIG. 2 is a diagram of the components of a technical fingerprint system 121 for mobile transportation platform data capture, according to one embodiment. By way of example, the technical fingerprint system 121 includes one or more components for providing mobile transportation platform data capture according to the various embodiments described herein. It is contemplated that the functions of these components may be combined or performed by other components of equivalent functionality. In this embodiment, the technical fingerprint system 121 includes an access control and security module 201, a configuration module 203, an asset discovery module 205, a data collection module 207, data normalization module 209, a data analytics module 211, a user interface (UI) and dashboard generation module 213, and an application programming interface (API) 215. The above presented modules and components of the technical fingerprint system 121 can be implemented in hardware, firmware, software, or a combination thereof. In one embodiment, the technical fingerprint system 121 and/or one or more of the modules 201-215 may be implemented as a cloud based service, local service, native application, or combination thereof. The functions of the technical fingerprint system 121 and the modules 201-215 are discussed with respect to FIGS. 3 and 4A and 4B below.

Figure 3:
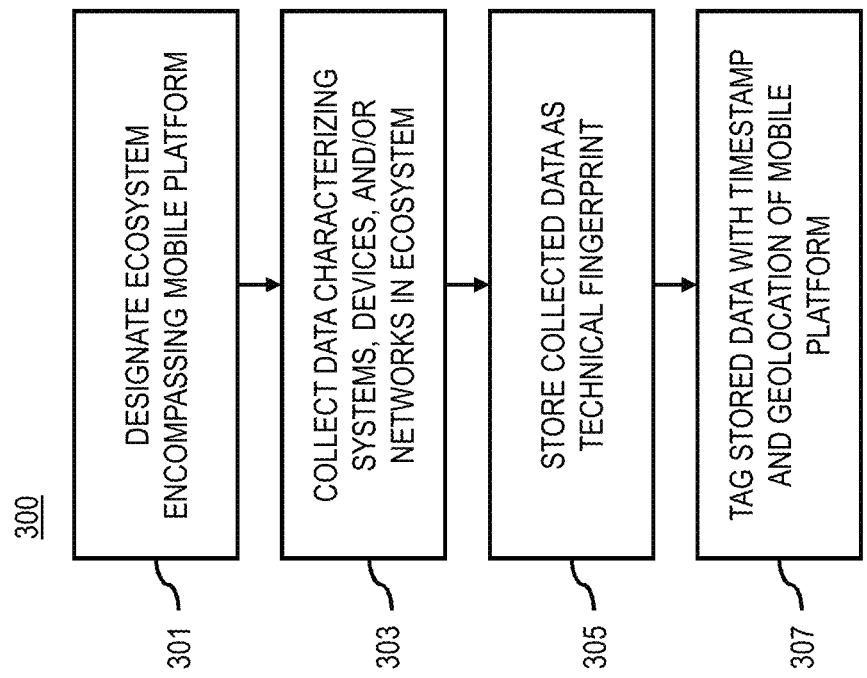
FIG. 3 is a flowchart of a process for providing mobile transportation platform data capture for analytics, according to one embodiment.
Figure 6:
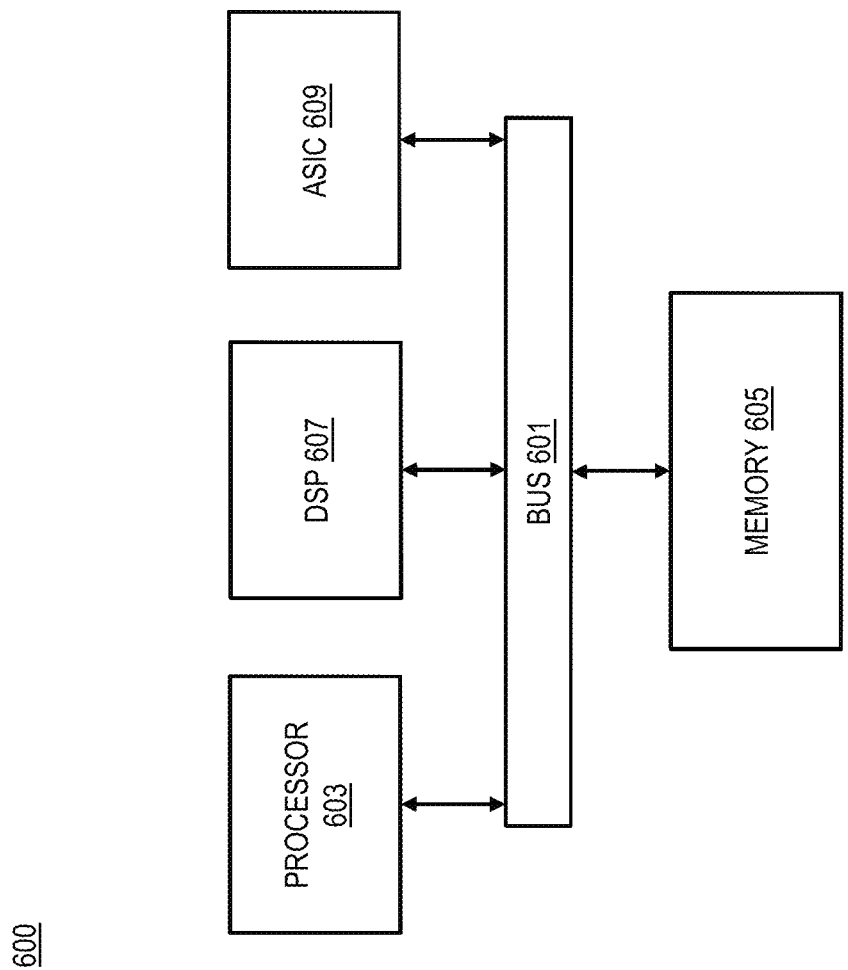
FIG. 6 is a diagram of a chip set that can be used to implement an embodiment of the invention.

FIG. 3 is a flowchart of a process for providing mobile transportation platform data capture for analytics, according to one embodiment. In various embodiments, the FIG. 3 is a flowchart of a process for providing mobile transportation platform data capture for analytics, according to one embodiment the technical fingerprint system 121 and/or any of the modules 201-215 may perform one or more portions of the process 300 and may be implemented in, for instance, a chip set including a processor and a memory as shown in FIG. 6. As such, the technical fingerprint system 121 and/or the modules 201-215 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

Each transportation mode and corresponding mobile transportation platforms 103 as well as the environments or ecosystems 101 they operate in are critical for society, business operations, government services, long-distance freight and passenger travel and the general efficiency of the overall economy. A well understood, robust, and secure operational environment (i.e., ecosystem) is important for all modes of transportation (e.g., aircraft, automobiles, trains, ships, etc.). As noted above, like the mobile platforms 103 themselves, the operating environment or ecosystem 101 for mobile platforms 103 is complex and dynamic, and subsequently a technical challenge to define in a finite way.

In one embodiment, to initiate the process defining the ecosystems 101 of mobile platforms 103, the access control and security module 201 can authenticate authorized users for access to the technical fingerprint platform 103. In embodiments where the technical fingerprint is considered sensitive information (e.g., technical data about airplanes, autonomous automobiles, etc. and their technical configurations), the access control and security module 201 can ensure that only users who have valid security credentials will have access to the technical fingerprint system 121. As previously discussed, in one embodiment, a fee or subscription may be needed for access to the technical fingerprint system 121. In this case, the access control and security module 201 can verify the receipt of the fee and/or validity of the subscription before granting access. It is contemplated that the access control and security module 201 can use any other means known in the art to control access as well as protect the security of the data and systems of the technical fingerprint system 121.

In one embodiment, after being granted access, a user can interact with the configuration module 203 to configure how the technical fingerprint system 121 will generate technical fingerprint data for a given mobile platform 103 and its ecosystem 101. As discussed, the technical systems, networks, devices, signals, etc. of a mobile platform 103 (e.g., an aviation or autonomous automobile platform) and its ecosystem 101 can be very complex with many subsystems. Accordingly, the configuration module 203 can be used to specify which of the systems, devices, networks, signals, etc. to discover and interrogate to create a requested technical fingerprint. For example, a support service provider (e.g., baggage handling contractor) may be only interested in generating fingerprint data related to the systems, devices, networks, signals, etc. related to its service. In another example, if a user is monitoring for a known threat or vulnerability (e.g., a known insecure communications port, a vulnerable operating system version, a counterfeit part, etc.), the configuration module 103 can be used to configure the technical fingerprint system 121 to interrogate the mobile platform 103 and its ecosystem 101 for the specified one or more vulnerabilities. The configuration module 203 can also be used to specify parameters for how to generate the fingerprint data including, but not limited, what mobile platform 103 and ecosystem 101, when and where to monitor the mobile platform 103 and ecosystem 101, size of the ecosystem 101 (e.g., perimeter or radius from the mobile platform 103) to monitor, and/or any other configurable parameter of the technical fingerprint system 121. In one embodiment, the configuration module 201 can generate a configuration file based on the configured options for generating technical fingerprint data. The configuration file can be stored in, for instance, the execution configuration database 217. In this way, the same configuration file can be retrieved at different times to generate comparable technical fingerprint data.

In a separate process or as part of the optional access and configuration processes described above, the configuration module 203 can designate an ecosystem 101 encompassing a mobile transportation platform 103 (step 301). As previously discussed, the ecosystem 101 is a physical environment within a perimeter surrounding the mobile transportation platform 103. It is contemplated that the configuration module 203 can use any process or procedure to define this perimeter. For example, the perimeter can be a predetermined radius or boundary from a location of the mobile platform 103. In this way, as the mobile platform 103 moves over time, the corresponding ecosystem 101 also changes. In another embodiment, the perimeter can be based on the physical layout of the environment in which the mobile platform 103 is currently located. For example (as shown in FIG. 1), if the mobile platform 103 is an aircraft stopped at a terminal gate 103, the perimeter can be defined to encompass the gate 103 as well as areas of the tarmac within a predetermined distance threshold (e.g., 500 m, 1,000 m, etc.). In one embodiment, the distance threshold can be based not on physical proximity but network proximity. For example, the threshold can be based on what devices have direct connections (e.g., wired or wireless connections) to the device regardless of distance, what devices are within the same domain/sub-domain/etc., and/or equivalent. In yet another embodiment, the threshold can be based on radio range of the identified and unidentified devices operating in the ecosystem 101.

Many mobile platforms 103 operate in a computing and communications ecosystem 101 that is complex, geographically dispersed, only generally uniform from one location to another, and subject to change. Accordingly, the definition of an ecosystem 101 or the physical perimeter or environments comprising the ecosystem 101 can be flexible. In one embodiment, the ecosystem can scale hierarchically based on the transportation infrastructure. For example, in an aircraft use case, multiple ecosystems 103 can be defined at the gate level with individual mobile platforms 103 (e.g., individual airplanes) corresponding to each gate. The individual terminal gates 103 corresponding to an individual airport can then be associated as a combined airport ecosystem. Multiple airport ecosystems can then be further combined into regional ecosystems and so on, until a national or global ecosystem is defined.

There are many unique characteristics of the large ecosystems 101 comprising multiple combined smaller ecosystems 101 (e.g., the National Air Space (NAS)) such as the potential size and scale of such combined ecosystems. For example, the NAS and the mobile platforms 103 operating in it are comprised of thousands of individual systems, devices, networks, etc., many with hundreds of individual application programs, millions of lines of code, thousands of aircraft models and configurations, millions of computing platforms in and around those aircraft, all running multiple types, and versions of differing operating systems. The NAS represents a large and complex ecosystem that is constantly changing. While this size and complexity can be a challenge, the embodiments described herein for creating a technical footprint of mobile platforms 103 and their ecosystems provide the means for collecting and aggregating a specific set of data that can be analyzed for a variety of technical, operational, cyber, performance, evaluation, and safety reasons.

By designating and organizing technical fingerprint data into designated ecosystems 101 in which a mobile platform 103 operates, the technical fingerprint system 121 advantageously provides a framework for collecting and storing technical configuration to comprehensively characterize the systems, devices, networks, signals, persons, etc. operating on the mobile platforms 103 and the physical environment in proximity to the mobile platforms 103.

As part of this framework, in step 303, the data collection module 207 collects data characterizing one or more systems, one or more devices, one or more networks, one or more signals, or a combination thereof located in the ecosystem 101 (e.g., designated according to step 301 above). In one embodiment, the one or more systems, the one or more devices, the one or more networks, the one or more signals, or a combination thereof are local, remote, web-based, or virtual that are discovered to be within the environment of the designated ecosystem 101. The combinations of discovered systems, devices, networks, signals, etc. can vary greatly and often are unique to individual ecosystems 101, so that the combinations of the discovered assets (i.e., technical configurations) can act as pseudo-fingerprints.

As described above, it is it is not uncommon for mobile platforms 103 in the aviation space have one-off, unique technical configurations. Identical aircraft models, being manufactured in the same facility, adjacent to one another on the same assembly line, for the same airline, may not be identical. This is due, in part, to variations in manufacturing, systems, potential differences in integrated circuit boards, processors, programmable logic controllers, operating systems, software, and many other technical components. In one embodiment, the data collection module 207 can collect data on these unique configurations to construct a technical fingerprint of the monitored ecosystem 101.

Other variables or characteristics can further contribute to the variability and uniqueness of an ecosystem 101. Data on the characteristics of terminals and ports in the ecosystem 101 where mobile platforms 103 originate or terminate trips and receive maintenance and other services can have wide variability. Many mobile platforms 103 can also operate in public/private facilities that exist to enable air, ground, or water travel. These facilities are used to initiate or terminate travel and are themselves complex computing and communications hubs, adding complexity data that is collected by the data collection module 207 to characterize to the ecosystem 101.

At these terminals and ports where mobile platforms 103 originate or terminate trips there can be multiple operations needed to enable the mobile platforms 103 to be used. These operations provide support for the providers of these services and the passengers or freight that will use these mobile platforms 103. Around the globe, thousands of different public and private organizations support and use various systems and devices at terminals. In one embodiment, the data collection module 207 can also collect data characterizing the support services discovered in a monitored ecosystem 101 as part of the technical fingerprint data for the ecosystem 101.

Across these organizations, there is variability in security and competency that can impact the mobile platform 103 and its operating ecosystem 101. For example, passenger arrival and security processing, scheduling, passenger manifest management, passenger loading processes, passenger luggage management, freight loading, catering, traffic management, clearance, route management, platform service, fuel operations, and are an abbreviated and not exhaustive or exclusive list. Each of these functions require coordination between humans and systems using computers, communications, control, networks and intelligence. In one embodiment, the data collection module 207 can also collect such related data as part of the technical fingerprint data for the ecosystem 101.

In many cases, wired and wireless networks are utilized to execute these support functions and in these public/private facilities there are many deployed networks. The human work force can also use wireless networks for radio and voice communication, and many of the vehicles use the same networks. Other tools and implements needed for the job use wireless or wired networks for systems control, vehicle management, or process monitoring. All leverage the increased efficiency and improved information sharing that networks provide. Concurrent with the networking provided for facility operations, almost all public/private transportation hubs also provide network connections for passengers in terminals and/or on the mobile platforms 103 for their own private use. Accordingly, the data collection module 207 can also collect data to characterize such wired and wireless networks as part of the technical fingerprint data for the ecosystem 101.

Further, in these public facilities there are many unknown networks and/or unknown signals that are created by unknown individuals, or by unknown devices, and other unknown sources. These networks may be created on the fly, and open to anything or anyone willing to connect and then they may appear and disappear randomly. Accordingly, data on these unknown networks, signals, devices, individuals, etc. can be collected as part of the technical fingerprint data for the ecosystem 101.

In these public, terminals and hubs, there are an increasing number of light weight computing and communicating devices, frequently referred to as the Internet of Things (IoT). IoT include a wide array of network enabled computing platforms. These devices often have multiple radios and by default are constantly trying to connect. They frequently attempt to make ad-hoc connections and have operational models that range from sophisticated attempts to form Mobile Ad-Hoc Networks (MANET) to simple attempts to connect and share content. In one embodiment, data on these devices, networks, connections, etc. as well as the signals they produce can be collected as part of the technical fingerprint data for the ecosystem 101.

The devices themselves can be widely diverse with respect to complexity of operating systems they run, the number and type of radios they have and the software that runs on them. Some have capable operating systems and others have simple instructions sets. The capability of the radios on these devices can also vary widely. For example, they may include but are not limited to Internet Protocol (IP), or they may use any of the long list of wireless protocols including, 2G-5G, LTE, Bluetooth, ZigBee, Z-Wave, LoRA, 6LoWPAN, Thread, Weightless, and/or any other existing or future network or communication protocols. These devices can contribute to the unique technical fingerprint data of the ecosystem 101.

In summary, the operating ecosystem 101 of mobile platforms 103 while in transportation facilities can be a complex combination of diverse systems, devices, networks, etc. using a large community of communication methodologies, that are frequently changing. In one embodiment, within this complex environment, the data collection module 207 can interact with the asset discovery module 205 to identify the various networks, systems, devices, signals, etc. that can be found in a given ecosystem 101. The asset discovery module 205 can use any asset discovery means known in the art to determine what systems, devices, networks, signals, etc. are located in the designated ecosystem 101 of the mobile platform 103. For example, the asset discovery module 205 can potentially interrogate, determine and record the architecture of the networks and/or buses that are on the mobile platform 103, and the devices that are connected to these networks and buses. The asset discovery module 205 can also discover and record other networks, systems, devices, signals, etc. that are located in the ecosystem 101. In one embodiment, the asset discovery module 205 can also identify networks, systems, devices, signals, etc. are not physically in the ecosystem 101 but are within a predetermined communications range of the mobile platform 103 or its ecosystem 101 (e.g., within one network hop).

In other words, in one embodiment, the asset discovery module 205 discovers the one or more systems, the one or more devices, the one or more networks, the one or more signals, or a combination thereof based on a connectivity to one or more systems on one or more data buses of the mobile transportation platform. By way of example, the one or more data busses are attached with one or more devices with listening ports, one or more transmitting ports, or a combination thereof identified; and wherein the one or more data buses are based on one or more communication services including, at least in part, a User Datagram Protocol (UDP), Transmission Control Protocol (TCP), Simple Network Management Protocol (SNMP), Bluetooth, or a combination thereof.

In another embodiment, the asset discovery module 205 can use remote or non-invasive asset discovery methodologies known in the art including, but not limited to, architectural configurations, RF signal detectors, image recognition, or equivalent to identify specific systems, devices, networks, etc. For example, the asset discovery module 205 can process RF signals collected from the ecosystem 101 and/or mobile platform 103 to identify the one or more systems, the one or more devices, the one or more networks, the one or more signals, or a combination thereof.

In one embodiment, after discovery of the systems, devices, networks, etc. by the asset discovery module 205, the data collection module 207 can inspect, interrogate, evaluate and record the data characterizing the systems, devices, networks, etc., including, but not limited to, characteristics and properties of computing, communications, and control systems on mobile platforms 103 and ecosystem 101. In one embodiment, the collected data includes, but is not limited to, the properties of the operating systems on every system, devices, networks on the mobile platform 103 and in the ecosystem 101. This data further includes all software and the properties of the software on the mobile platform 103 and ecosystem 101. The data collection module 207 will also record the software and data that these devices consume and produce during a data collection session, the properties of the wired and wireless networks, and the computing device's capabilities and other computing and communications properties of these devices.

In one embodiment, the process will also capture as much data as is available from the ecosystem 101 where the mobile platform 103 resides, the data that is produced on the mobile platform 103 and other related data including, but not limited to, time of day, geolocation, weather, or other data such as potential threat source or threat actor, intelligence data, economic data, and/or political data.

On the mobile platform 103, the data collection module 207 may or may not utilize granted permissions for access to the mobile platform 103's computing and networking environment and the properties of these computing and networking devices. The operating environment or ecosystem 101 surrounding the mobile platform 103 will be inspected, interrogated and evaluated for information and properties that may be granted, as well as public information that is open.

In one embodiment, the technical fingerprint system 121 can be customized for a specific use. For example, utilizing configuration options (e.g., provided by the configuration module 203), the technical fingerprint system 121 and its modules 201-215 are capable of specified execution. In other words, it would be possible to capture technical fingerprint data on the entire ecosystem 101 in proximity of the mobile platform 103, or only on the mobile platform 103 itself, or a subset of the mobile platform 103 or the ecosystem 101. In one embodiment, the technical fingerprint system 121 may be ecosystem specific, platform specific, or use other parameters or similar identifying characteristics to select a specific execution context or model. The technical fingerprint system 121 can also be configurable to allow a selection of subsets of information to be subject to the technical fingerprint data capture process according to any number of variables including execution timing, speed, and/or privacy.

In one embodiment, the technical fingerprint data capture process is benign, meaning that the process does not exploit a network, hardware, or software if it could negatively affect it in any way.

In one embodiment, the data collection module 207 of the technical fingerprint system 121 uses various configuration evaluation methodologies to scan and capture the characteristics and properties of installed software, hardware, and configuration data on the discovered systems, devices, networks, etc. For example, the data collection module 207 will consider all computing, communications, and control systems, including all services they enable and support. This also includes all systems which control direction and velocity, navigation, and cabin controls regardless of mobile platform design. Further, the data collection module 207 can scan and record data about the systems and networks that control the mobile transportation platforms 103.

In one embodiment, the data collection module 207 can use the discovered networks to gather information on the network itself, including network devices and the computer systems connected to the network. For example, the network can be scanned to collect communications protocols, routing data, and content, operating system (OS) properties, network port scanning for network service availability as well as other existing network interrogations.

In one embodiment, the data collection module 207 can scan discovered onboard and network connected systems for all characteristics, assessing specifics on operating systems and applications running on them. This would include firmware status, software patch status and other patch management data, version management data, access information, log files, and other properties data. The data collection module 207 would also determine other network or communication bus technologies configured on the platform 103 or in the ecosystem 101, and evaluate the services and devices connected to them for the same properties.

In addition to networks, communication busses, the hardware connected to these communications technologies and the operating systems running the connected busses can be collected. For example, the data collection module 207 can also collect file information including file permissions data, file origin data, file type data, size metrics, modification data including date created, date saved, date modified, content data, file management data and the location where the file resides, file permissions and access data attributes, and other information on files that reside on the mobile platform. Mobile platform identifiers and trip information will be collected including identification data such as model, operator, passenger manifest, trip itinerary or crew information.

In one embodiment, accessible Supervisory Control and Data Acquisition (SCADA) systems on the mobile platforms will be discovered and collected. For example, one or more characteristics of these onboard Industrial Control Systems (ICS) can be collected and recorded. As indicated above, the asset discovery module 205 can identify the systems, devices, networks, etc. in the control systems through a number of sensor and embedded device discovery methodologies known in the art. The data collection module 207 can then interrogate the discovered systems, devices, networks, etc., and record this data.

Examples of the type of data or parameters to be collected from the discovered systems, devices, networks include, but are not limited to:

Access data indicating logged-on users, configured user accounts, account details, uptime, access control information, access logs, control logs, other similarity access information/records, or a combination thereof;

System properties, device properties, network properties, an operating system type, an operating system patch status, an operating system version, a firmware version, or a combination thereof;

Connection history of the one or more systems, the one or more devices, or a combination thereof with respect to the one or more networks or the mobile transportation platform;

A terminal, a gate, a dock, a nearby vehicle, a vendor, an employee, operations staff, a contractor, associated communications devices, a construction project, a facility repair, a facility inspection, or a combination thereof identified within the physical environment of the ecosystem;

Identification information of the one or more systems, the one or more devices, the one or more networks, or a combination thereof;

In step 305, the data normalization module 209 stores the collected data as a technical fingerprint data record in a normalized or consistent format for the monitored ecosystem 101. It is contemplated that the data normalization module 209 can use any data translator means known in the art to convert collected data into designated format of the technical fingerprint data record. In one embodiment, the technical fingerprint data record aggregates the data collected from the systems, devices, networks, signals etc. discovered on the mobile platform 103, in the ecosystem 101, or a combination thereof. More specifically, the data collection module 207 (e.g., in combination with the data normalization module 209) can identify and store in a data repository (e.g., the technical fingerprint database 123) as much information as can be electronically collected about the computational, communicating, process controlling, networked devices, signals, etc. in a designated ecosystem 101.

In addition, the data collection module 207 can identify the collected data originating from and record the technical fingerprint of the surrounding area within geographic and radio range of the mobile platform 103 or the ecosystem 101. For example, radio signals, devices connected to networks using those signals, lightweight computing devices or other radio enabled devices, the data they transmit, networks they connect to and other properties data will have been collected and recorded by the data collection module 207. The data normalization module 209 can then use the collected data to produce a comprehensive technical fingerprint of the electronic properties of the overall ecosystem 101 and the mobile platform 103.

As previously described, the resulting technical fingerprint data can be stored in a data structure such as the technical fingerprint database 123 or equivalent. In one embodiment, the technical fingerprint database 123 can be a purpose-built data structure that is optimized for input-output, analytical processes and other data analysis objectives.

In step 307, the data collection module 207 and/or the data normalization module 209 can tag the technical fingerprint data record with a timestamp indicating a time the data was collected, and geolocation associated with the ecosystem 101 when the data was collected. For example, the geolocation can be the location of the mobile platform 103 and/or any the networks, systems, devices, signals, etc. discovered in the ecosystem 101. In this way, the technical fingerprint data records can be sequenced by time and/or location for monitored mobile platforms 103 and/or ecosystems 101. As described above, in one embodiment, the technical fingerprint system 121 can collect and store technical fingerprint data for a given mobile platform 103 and its ecosystem 101 periodically, on demand, according to a schedule, etc., thereby creating multiple technical fingerprint data records. By tagging the data records with a timestamp and/or geolocation, the data analytics module 111 can sequence or sort the technical fingerprint data records according to time and/or location to facilitate temporally or spatially based data analytics.

Figure 4:
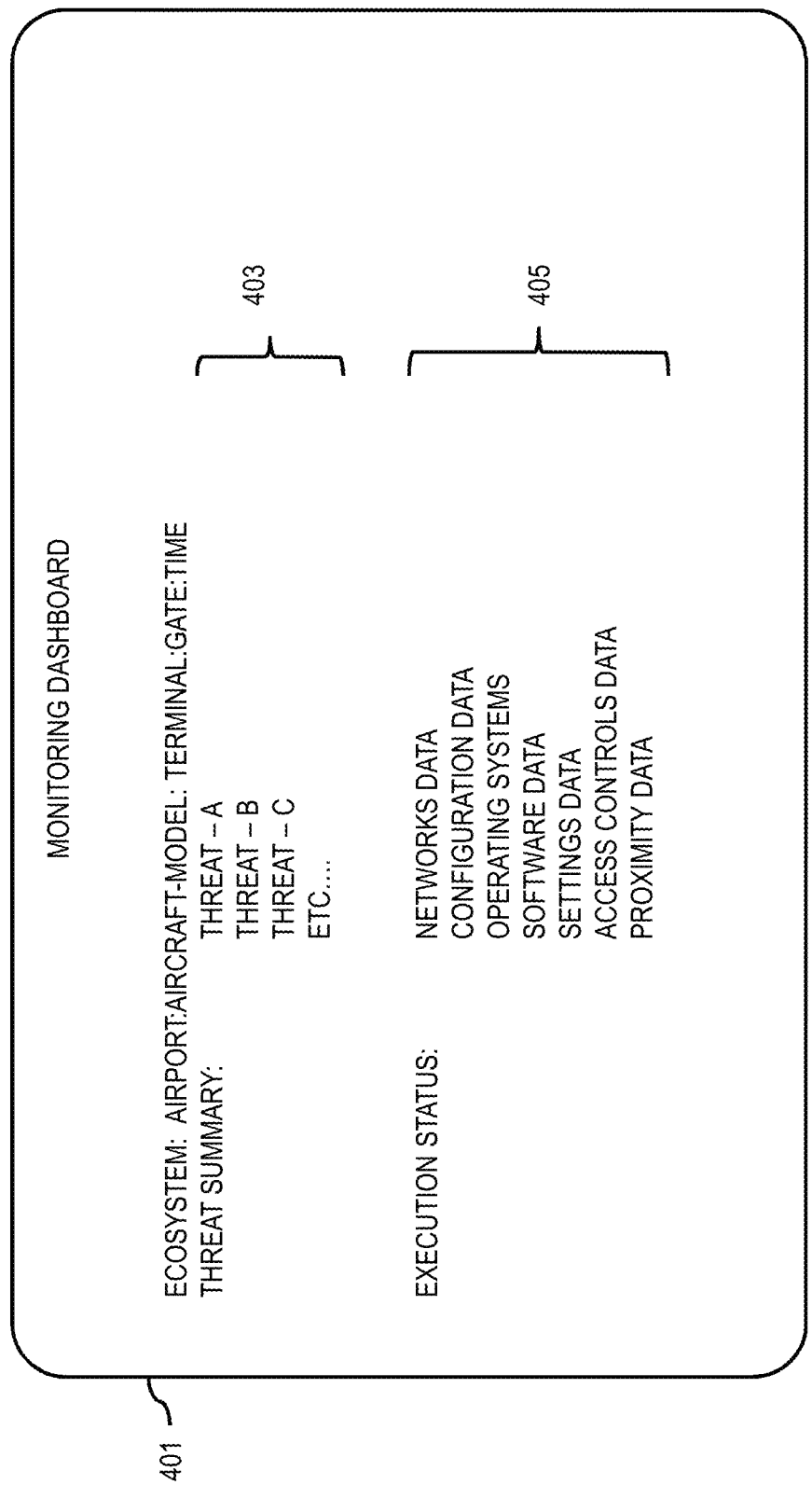
FIG. 4 is a diagram illustrating an example user interface for providing mobile transportation platform data capture for data analytics, according to one embodiment.

In one embodiment, the dashboard module 213 and/or API 215 enables the technical fingerprint data record for user inspection. For example, the UI and dashboard generation module 213 can present a dashboard 131 or other user equivalent interface on the client device 125 to provide a near-real-time display of a representation of the technical fingerprint data for monitoring the mobile platform 103 and its ecosystem 101. FIG. 4 illustrates an example dashboard UI 401 that presents at least some of the collected data stored in real-time as technical fingerprint data to facilitate this monitoring of the ecosystem 101. In the example of FIG. 4, the technical fingerprint system 121 is used to monitor an ecosystem comprising an aircraft at a given location and time in real-time. In this example, the aircraft is identified by "Aircraft Model", its location is designated by "Terminal: Gate", and time at the location is "Time". Real-time, for instance, refers to presenting the technical fingerprint data in the dashboard UI 401 within a threshold time period from the collection of the technical fingerprint data. In one embodiment, this threshold time period is configurable by a user or administrator can range from milliseconds to minutes or any other configured time period. The dashboard can display multiple mobile transportation platforms in a summary format As shown, the dashboard UI 401 presents a threat summary 403 (e.g., indicating potential security threats or vulnerabilities) and an execution status 405 (e.g., indicating the different components of the mobile platform 103 and ecosystem 101 that is being monitored). For example, the data analytics module 211 can perform a near real-time analysis of the technical fingerprint data against a threat database 219. The threat database 219 can include information from third-party providers (e.g., government, cyber security companies, peer reports, etc.) that indicates current threat vulnerabilities. For example, a threat record of the threat database 219 can indicate a threat vulnerability name and a corresponding data about the vulnerability. The threat database 219, for instance, can indicate an operating system version that has a known vulnerability, a firmware version for circuit board that has a known vulnerability, an outdated device part number, etc. If the collected fingerprint data matches or indicates any of the threats stored the threat database 219, the dashboard generation module 213 can display the threat vulnerability information in the threat summary 403 section of the UI 401.

As noted above, the execution status 405 section presents a summary of the components of the mobile platform 103 and its ecosystem 101 that are being monitored. The specific components (e.g., networks, systems, devices, signals, etc.) that are being monitored can be specified using the configuration files of the execution configuration database 217. In this example, the components include: (1) networks data (e.g., data on characteristics of detected networks), (2) configuration data (e.g., data on the configuration status of monitored components), (3) operating systems (e.g., data on characteristics of operating systems used on detected components, including version, options, update status, etc.), (4) software data (e.g., data on characteristics of software executing on detected components including version, options, update status, etc.), (5) settings data (e.g., data indicating the settings configured on detected components), (6) access controls data (e.g., data indicating security settings, account settings, user accounts, etc. of detected components), and (7) proximity data (e.g., data on components detected in proximity of the mobile platform 103 and within the ecosystem 101). In one embodiment, the UI 401 presents each component data as selectable options. On detecting a user interaction with the UI for selection one of the component data, more detail information about the component data can be presented (e.g., selecting network data can result in the UI 401 displaying a list of detected networks, types of the networks, number of connected users, etc.).

In one embodiment, when the API 215 is used in place of or in addition to the dashboard generation module 213, the technical fingerprint data (e.g., the data presented in the UI 401 described above) can be streamed in real-time to the client device 125 or the API 215 instead of presenting the dashboard UI 401 by the dashboard generation module 213. It is noted that although the dashboard UI 401 is described as a real-time dashboard, a similar or equivalent UI can be used to display non-real-time or post collection technical fingerprint data.

In one embodiment, the dashboard generation module 213 and/or API 215 can provide the technical fingerprint data record for post-collection data analysis. By way of example, the post-collection analysis includes, but is not limited to, a diagnostic analysis, a cyber forensics analysis, platform configuration audit, or a combination thereof. For example, in one embodiment, the technical fingerprint data or collected data can include cyber-security data. The cyber-security data can include, at least in part, a time parameter, an access authorization, a system type, a system priority, a privacy setting, model information for the mobile transportation platform, a version of the mobile transportation platform, a crew of the mobile transportation platform, a route of the mobile transportation platform, or a combination thereof. The data analytics module 211 can then process the cyber-security data to determine one or more potential cyber-security threats (e.g., based on threat data stored in the threat database 219 or other methods) from among the one or more systems, the one or more devices, the one or more networks, the one or more signals, or a combination thereof. The technical fingerprint system 121 can store the one or more potential cyber-security threats in the technical fingerprint data record, or otherwise present the potential threat information to a user (e.g., via the client device 125). In one embodiment, the data analytics module 211 can compare any determined potential threats or technical configuration data against known threats or technical data patterns associated with known threats.

In one embodiment, to present a more succinct representation of the technical fingerprint data or potential threats to an end user, the data analytics module 211 can process the technical fingerprint data to provide a quantitative score to a set of potential cyber security threat vulnerabilities to mobile platform 103, ecosystem 101, or both. For example, each potential threat vulnerability (e.g., included in the threat database 219) may have a set of technical configuration data that is most indicative of the threat (e.g., a specific number of open networks, unknown devices, firmware versions, etc.). The data analytics module 211 can then evaluate observed technical fingerprint data for a monitored mobile platform 103 and/or ecosystem 101 against the known threats to calculate a score representing level of vulnerability to a given threat. Additionally, when the score is above a threshold for a particular risk, the data analysis module can issue a potential threat warning or otherwise indicate the score or representation of the score to the user or take any other determined action.

In one embodiment, the data analytics module 211 can process the generated technical fingerprint data records to determine status information about a fleet of mobile platforms, a monitored mobile platform 103 and/or its ecosystem 101. For example, the data analytics module 211 can process the technical fingerprint data to analyzed all collected data to provide quality or completeness check on planned changes/maintenance to the one or more systems, devices, networks, etc. of a monitored mobile platform 103 and/or ecosystem 101. For example, the data analytics module 211 can compared the technical fingerprint data collected from the mobile platform 103 and/or ecosystem 101 following a reported complete of the changes/maintenance against an expected fingerprint. The degree of matching can indicate a quality or level of completeness of the planned changes/maintenance. In addition, comparison of the observed technical fingerprint to a reference or target fingerprint can indicate whether to recommend an upgrade to the one or more systems, the one or more devices, the one or more networks, the mobile transportation platform 103, the ecosystem 101, or a combination thereof. For example, if operating system version, patch version, firmware version, hardware revision number, etc. do not match the expected fingerprint, the data analytics module 211 can recommend an upgrade or take any other determined action.

Returning to FIG. 1, the client device 125 and/or any of the discoverable devices in the ecosystem 101 can be any type of embedded system, mobile terminal, fixed terminal, or portable terminal, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the client device 125 or any of the discoverable devices can support any type of interface to the user (such as "wearable" circuitry, etc.).

In one embodiment, the technical fingerprint system 121, client devices 119 and/or any of the discoverable devices can be configured with various sensors, interfaces, services, etc. for asset discovery and/or data collection according to the various embodiments described herein. By way of example, the sensors may include a global positioning sensor for gathering location data (e.g., GPS), a RF detection sensor for detecting wireless signals or receivers for different short-range communications (e.g., cellular, Bluetooth, Wi-Fi, Li-Fi, near field communication (NFC) etc.), temporal information sensors, a camera/imaging sensor for gathering image data (e.g., image recognition of devices, systems, networks, persons, etc.), an audio recorder for gathering audio data, a chemical bio detector for detecting combustibles or other volatile chemicals, and the like.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mobile platform 103, technical fingerprint system 121, and client device 125 communicate with each other and other components of the system 100 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The processes described herein for providing mobile transportation platform data capture may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
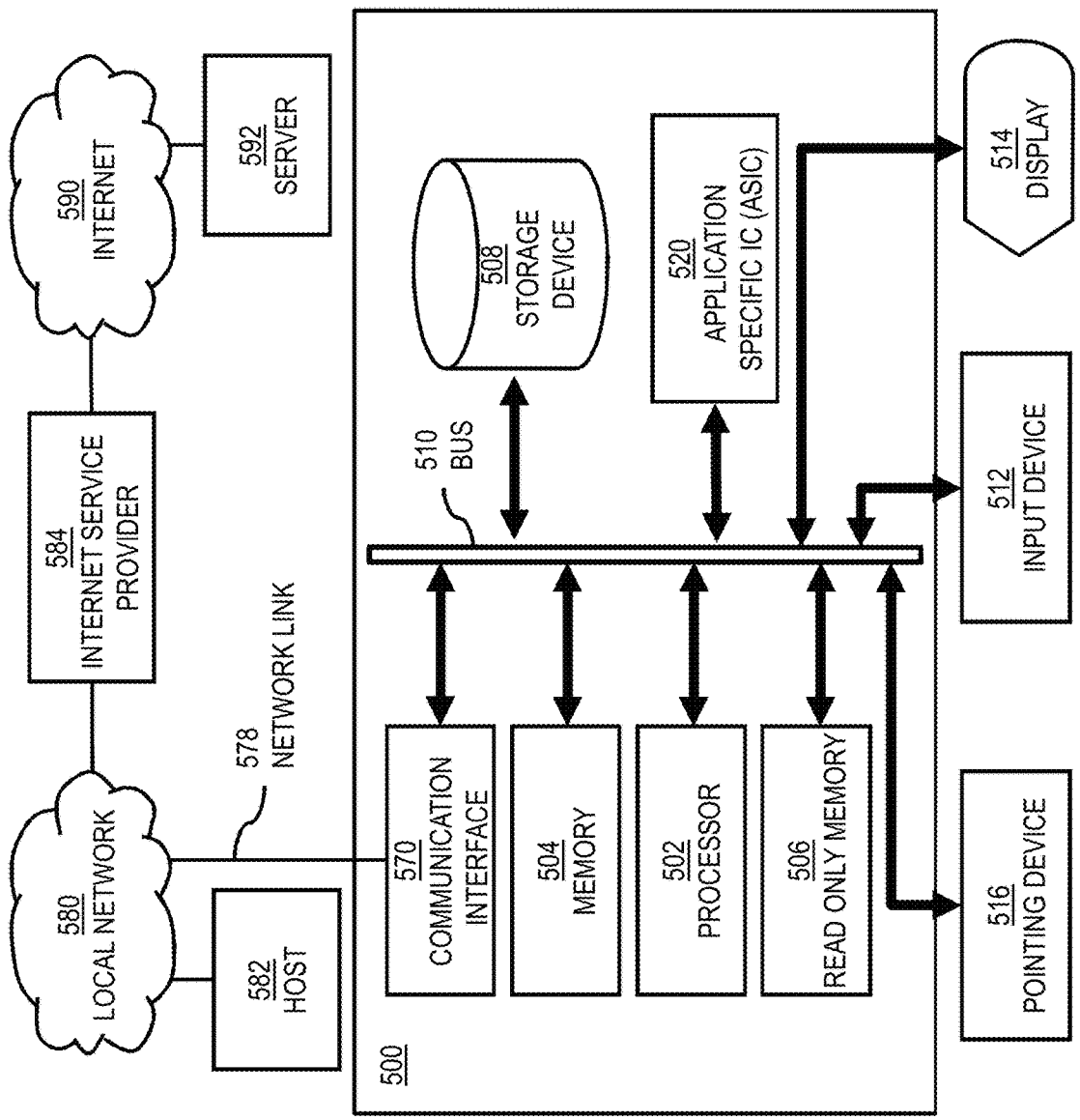
FIG. 5 is a diagram of hardware that can be used to implement an embodiment of the invention.

FIG. 5 illustrates a computer system 500 upon which an embodiment of the invention may be implemented. Computer system 500 is programmed (e.g., via computer program code or instructions) to providing mobile transportation platform data capture as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to provide mobile transportation platform data capture. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for providing mobile transportation platform data capture. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing mobile transportation platform data capture, is provided to the bus 510 for use by the processor from an external input device 512, such as a keyboard containing alphanumeric keys operated by a human user, a sensor, a microphone, an Infrared (IR) remote control, a joystick, a game pad, a stylus pen, or a touch screen. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a vacuum fluorescent display (VFD), a liquid crystal display (LCD), a light-emitting diode (LED), an organic light-emitting diode (OLED), a quantum dot display, a virtual reality (VR) headset, or plasma screen or printer for presenting text or images, and a pointing device 516, such as a mouse, a trackball, cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 121 for providing mobile transportation platform data capture.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, EEPROM, a flash memory, any other memory chip or cartridge, a carrier wave, or any other medium from which a computer can read.

FIG. 6 illustrates a chip set 600 upon which an embodiment of the invention may be implemented. Chip set 600 is programmed to provide mobile transportation platform data capture as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide mobile transportation platform data capture. The memory 605 also stores the data associated with or generated by the execution of the inventive steps.

Figure 7:
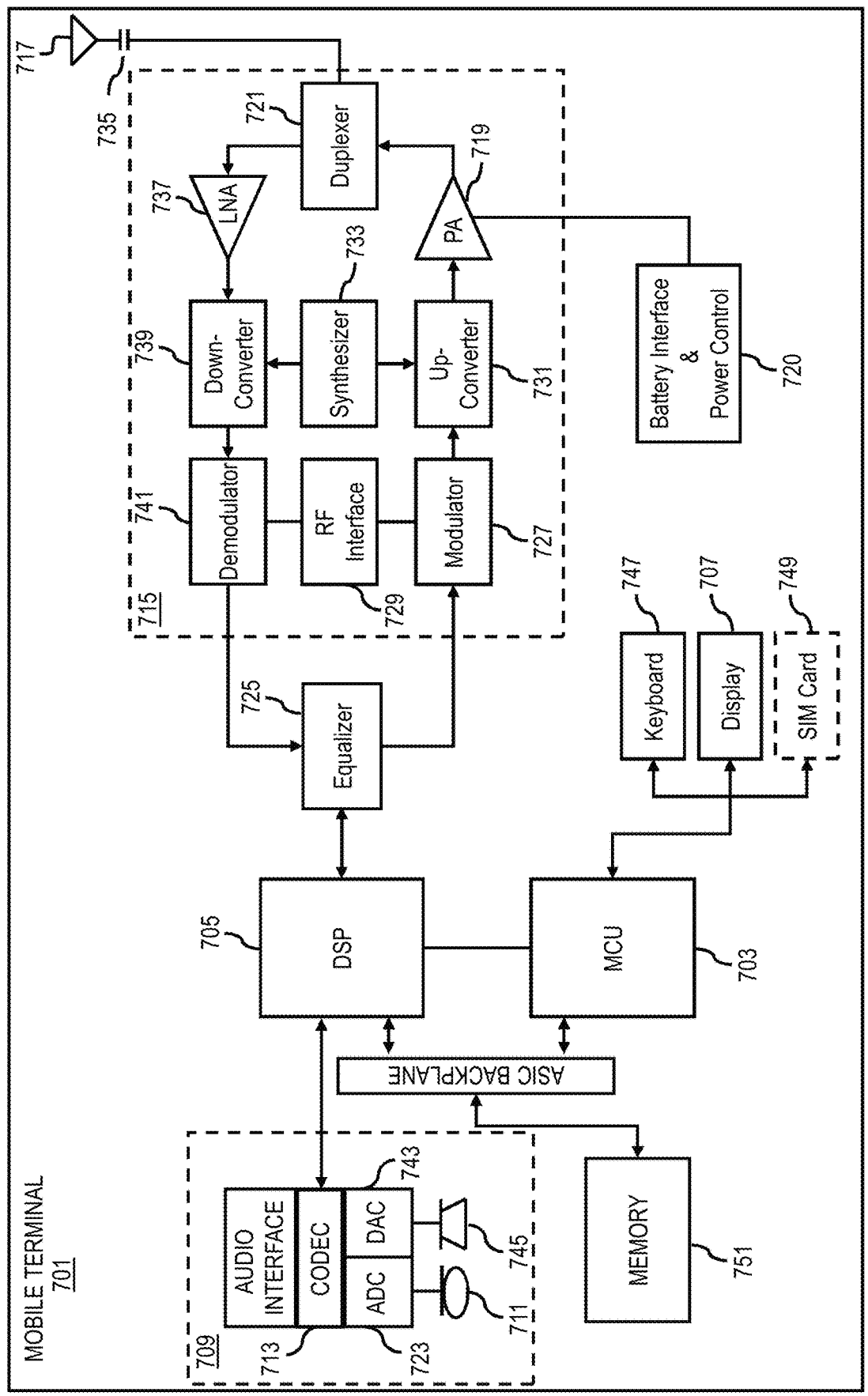
FIG. 7 is a diagram of a mobile terminal (e.g., handset) that can be used to implement an embodiment of the invention.

FIG. 7 is a diagram of exemplary components of a client device 125 and/or discoverable devices capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile station functions that offer automatic contact matching. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of client device 701 and/or discoverable device speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the client device 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile station 701 to provide mobile transportation platform data capture. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the station. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile station 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 751 may be, but not limited to, a single memory, CD, DVD, ROM, RAM, EEPROM, optical storage, or any other non-volatile or non-transitory storage medium capable of storing digital data.

An optionally incorporated SIM card 749 carries, for instance, important information, such as the cellular phone number, the carrier supplying service, subscription details, and security information. The SIM card 749 serves primarily to identify the mobile station 701 on a radio network. The card 749 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
designating, by a processor, an ecosystem including a mobile transportation platform, wherein the ecosystem is an environment delineated by a perimeter that encompasses an inside and outside of the mobile transportation platform and one or more systems, one or more devices, one or more networks, one or more signals or a combination thereof located outside the mobile transportation platform and in the perimeter of the ecosystem;
collecting technical configuration data characterizing one or more technical properties of the one or more systems, the one or more devices, the one or more networks, the one or more signals, or the combination thereof located in the ecosystem at a data collection time;
aggregating the technical configuration data as a technical fingerprint data record;
determining geolocation data for the one or more systems, the one or more devices, the one or more networks, the one or more signals, or a combination thereof located in the ecosystem at the data collection time; and
tagging the technical fingerprint data record with the data collection time, the geolocation data, or a combination thereof,
wherein the tagged technical fingerprint data represents a technical configuration of the ecosystem as a whole at a time corresponding to the data collection time, and
wherein the technical configuration data comprises a firmware version, operating system patch status, and operating system versions of the devices located in the ecosystem at the data collection time.

2. The method of claim 1, further comprising:
providing the technical fingerprint data record for a post-collection analysis.

3. The method of claim 2, wherein the post-collection analysis includes a cyber-security analysis, cyber forensics analysis, or a combination thereof.

4. The method of claim 1, wherein the technical configuration data is collected in near real-time, and wherein the method further comprises:
providing a user interface presenting the collected technical configuration data in near real-time.

5. The method of claim 1, wherein the one or more systems, the one or more devices, the one or more networks, the one or more signals, or a combination thereof are local, remote, web-based, or virtual.

6. The method of claim 1, further comprising:
initiating a discovery of the one or more systems, the one or more devices, the one or more networks, the one or more signals, or a combination thereof in the ecosystem including on the mobile transportation platform via an electronic scanning, an electronic interrogation, an electronic inspection, or a combination thereof.

7. The method of claim 6, wherein the discovery of the one or more systems, the one or more devices, the one or more networks, or a combination thereof is based on the electronic scanning, the electronic interrogation, the electronic inspection, or a combination thereof of one or more listening ports, one or more transmitting ports, or a combination thereof identified in the ecosystem.

8. The method of claim 1, wherein the technical configuration data includes access data indicating logged-on users, configured user accounts, account details, uptime, access control information, access logs, software, or a combination thereof.

9. The method of claim 1, wherein the technical configuration data further includes system properties, device properties, network properties, system logs, or a combination thereof.

10. The method of claim 1, further comprising:
processing radio frequency signals collected from the ecosystem to identify the one or more systems, the one or more devices, the one or more networks, the one or more signals, or a combination thereof.

11. The method of claim 1, wherein the technical configuration data includes a connection history of the one or more systems, the one or more devices, or a combination thereof with respect to the one or more networks, the mobile transportation platform, the ecosystem, or a combination thereof.

12. The method of claim 1, wherein the technical configuration data includes a terminal, a gate, a dock, a nearby vehicle, a vendor, an employee, operations staff, a contractor, associated communications devices, a construction project, a facility repair, a facility inspection, or a combination thereof identified in the ecosystem.

13. The method of claim 1, wherein the technical configuration data includes ownership information, identification information, or combination thereof of the one or more systems, the one or more devices, the one or more networks, the one or more signals, or a combination thereof.

14. The method of claim 1, wherein the technical configuration data includes cyber-security data, and wherein the method further comprises:
processing the cyber-security data to determine one or more potential cyber-security vulnerabilities from among the one or more systems, the one or more devices, the one or more networks, the one or more signals, or a combination thereof; and
storing the one or more potential cyber-security vulnerabilities in the technical fingerprint data record.

15. The method of claim 14, wherein the cyber-security data includes, at least in part, a time parameter, an access authorization, a system type, a system priority, a privacy setting, model information for the mobile transportation platform, a version of the mobile transportation platform, a crew of the mobile transportation platform, a route of the mobile transportation platform, or a combination thereof.

16. The method of claim 1, further comprising:
processing the technical fingerprint data record to determine whether the mobile transportation platform, the ecosystem, or a combination thereof has changed or does not meet a predetermined specification.

17. The method of claim 1, wherein the technical fingerprint data record is created based on determining a planned change to the mobile platform, the ecosystem, or a combination thereof.

18. The method of claim 1, further comprising:
processing the technical fingerprint data record to determine whether to recommend an upgrade to the one or more systems, the one or more devices, the one or more networks, the mobile transportation platform, the ecosystem, or a combination thereof.

19. An apparatus comprising:
at least one processor; and
at least one memory including computer program code for one or more programs, the at least one memory and the computer program code configured to, with the at least one processor, cause the apparatus to perform at least the following, designate an ecosystem including a mobile transportation platform, wherein the ecosystem is an environment delineated by a perimeter that encompasses an inside and outside of the mobile transportation platform and one or more systems, one or more devices, one or more networks, one or more signals or a combination thereof located outside the mobile transportation platform and in the perimeter of the ecosystem;

collect technical configuration data characterizing one or more technical properties of the one or more systems, the one or more devices, the one or more networks, the one or more signals, or the combination thereof located in the ecosystem at a data collection time;

aggregate the technical configuration data as a technical fingerprint data record;

determine geolocation data for the one or more systems, the one or more devices, the one or more networks, the one or more signals, or a combination thereof located in the ecosystem at the data collection time; and tag the technical fingerprint data record with the data collection time, the geolocation data, or a combination thereof, wherein the tagged technical fingerprint data represents a technical configuration of the ecosystem as a whole at a time corresponding to the data collection time, and wherein the technical configuration data comprises a firmware version, operating system patch status, and operating system versions of the devices located in the ecosystem at the data collection time.

20. A non-transitory computer-readable storage medium carrying one or more sequences of one or more instructions which, when executed by one or more processors, cause an apparatus to perform:

designating an ecosystem including a mobile transportation platform, wherein the ecosystem is an environment delineated by a perimeter that encompasses an inside and outside of the mobile transportation platform and one or more systems, one or more devices, one or more networks, one or more signals or a combination thereof located outside the mobile transportation platform and in the perimeter of the ecosystem;

collecting technical configuration data characterizing one or more technical properties of the one or more systems, the one or more devices, the one or more networks, the one or more signals, or the combination thereof located in the ecosystem at a data collection time;

aggregating the technical configuration data as a technical fingerprint data record;

determining geolocation data for the one or more systems, the one or more devices, the one or more networks, the one or more signals, or a combination thereof located in the ecosystem at the data collection time; and tagging the technical fingerprint data record with the data collection time, the geolocation data, or a combination thereof, wherein the tagged technical fingerprint data represents a technical configuration of the ecosystem as a whole at a time corresponding to the data collection time, and wherein the technical configuration data comprises a firmware version, operating system patch status, and operating system versions of the devices located in the ecosystem at the data collection time.

21. The method of claim 1, wherein the ecosystem includes the mobile transportation platform and one or more support entities configured to perform one or more operational, mechanical and safety activities on the mobile transportation platform.

22. The method of claim 1, wherein the support entities are selected from the group consisting of: platform maintenance, fueling operations, luggage handling, cleaning operations, and catering operations.

23. The method of claim 1, wherein the mobile transportation platform comprises a fleet of trucks or an aircraft.

24. The method of claim 23, wherein the ecosystem of the aircraft further includes a terminal gate and a jetway.

* * * * *